United States Patent [19]

Haga

[11] Patent Number: 4,909,102
[45] Date of Patent: Mar. 20, 1990

[54] PLANETARY GEAR SYSTEM

[75] Inventor: Takashi Haga, Obu, Japan

[73] Assignee: Sumitomo Heavy Industries, Ltd., Tokyo, Japan

[21] Appl. No.: 193,479

[22] Filed: May 12, 1988

[30] Foreign Application Priority Data

| May 14, 1987 | [JP] | Japan | 62-71023[U] |
| May 14, 1987 | [JP] | Japan | 62-71024[U] |
| May 29, 1987 | [JP] | Japan | 62-81168[U] |
| May 29, 1987 | [JP] | Japan | 62-81169[U] |
| Jul. 8, 1987 | [JP] | Japan | 62-168611 |
| Dec. 23, 1987 | [JP] | Japan | 62-323867 |

[51] Int. Cl.⁴ .............................................. F16H 1/28
[52] U.S. Cl. ...................................... 475/168; 475/179
[58] Field of Search .................. 74/804, 805; 384/447, 384/564, 569

[56] References Cited

U.S. PATENT DOCUMENTS

| 2,666,345 | 1/1954 | Amberg | 74/804 |
| 3,129,611 | 4/1964 | Lee | 74/804 |
| 4,554,846 | 11/1985 | Distin, Jr. et al. | 74/804 X |
| 4,621,543 | 11/1986 | Gabilondo | 74/804 X |
| 4,697,477 | 10/1987 | Barr | 74/804 X |
| 4,776,708 | 10/1988 | Carlson | 384/447 |

FOREIGN PATENT DOCUMENTS

| 348634 | 2/1922 | Fed. Rep. of Germany . |
| 31-9414 | 6/1956 | Japan . |
| 60-127151 | 8/1985 | Japan . |
| 574572 | 4/1976 | Switzerland . |

OTHER PUBLICATIONS

Abstract of European Appln. No. 88107633.5.

Primary Examiner—Dwight G. Diehl
Assistant Examiner—Chris Campbell
Attorney, Agent, or Firm—Armstrong, Nikaido, Marmelstein, Kubovcik & Murray

[57] ABSTRACT

A planetary gear system comprises a plurality of external gears swingably rotated by at least three eccentric members juxtaposed axially with their phases offset from each other; an internal gear internally meshing with these external gears; and a flange for retaining pins fitted with a play in internal pin holes formed in the external gears. This planetary gear system is used as a planetary reduction gear when the eccentric members are rotatively driven with either one of the internal gear or the flange being held stationary, so as to obtain an output of reduced rotation, or as a planetary overdrive gear in which either one of the internal gear or the flange is held stationary, and an input is applied to the other to obtain an output of accelerated rotation from a shaft on which the eccentric members are installed. All the eccentric members are formed integrally as one component. Since the eccentric members are formed integrally, there is no possibility of the phase difference among the eccentric members becoming out of the phase as in the case where the eccentric members are formed separately. Consequently, the component members can be assembled with a high degree of accuracy, and a situation can be eliminated in which the external gears and the internal gear fail to engage smoothly due to any disorder in the phases of the eccentric members during operation. Further, since the eccentric members are formed integrally, although it becomes difficult to install rollers having inner peripheral rings as well as the external gear around the eccentric member in an intermediate portion, a measure for overcoming this problem is provided.

6 Claims, 22 Drawing Sheets

PLANETARY GEAR SYSTEM

BACKGROUND OF THE INVENTION

1. Field of the Invention

The present invention relates to a planetary gear system, and more particularly to a planetary gear system wherein an internal gear has a circular-arc-shaped tooth profile formed by pins or a combination of pins and rollers, while the tooth profile of each external gear has a trochoidal tooth profile, a circular-arc-shaped tooth, or the like constituted by epitrochoidal parallel curves, each of the external gears is swingably rotated by the rotation of an eccentric member fitted with the external gear, the internal and external gears are made to internally mesh with each other, thereby to output the rotation by decelerating or accelerating the input rotation.

2. Description of the Related Art

Hitherto, various reduction gears using internally meshing planetary reduction gears have been proposed. Amongst these reduction gears, there is a well-known planetary reduction gear which is known as a "Cyclo Reduction Gear" (registered trademark). This reduction gear is arranged as follows: The internal gear has a circular-arc-shaped tooth profile formed by pins or a combination of pins and rollers, while the external gears have a trochoidal tooth profile formed by epitrochoidal parallel curves. Internal pins or a combination of internal pins and internal rollers are fitted in the external gear with a play, each of the external gears swingably rotated by the rotation of an eccentric member fitted to the external gear. The internal and external gears are made to internally mesh with each other to output the rotation by reducing the input rotation. Since this "Cyclo Reduction Gear" permits transmission of a large torque and its reduction ratio is large, it is used as various types of reduction mechanism.

Referring to FIGS. 6 and 7, an example of the known "Cyclo Reduction Gear" will be described below.

FIG. 6 is a cross-sectional view illustrating an example of the known planetary reduction gear, while FIG. 7 is a cross-sectional view taken along the line VII—VII of FIG. 6.

In this example, although the rotation of an input rotating shaft 1 is obtained as the reduced rotation of an output shaft 2, an arrangement may be alternately provided such that the output shaft 2 is fixed, and the reduced rotation is obtained from the internal gear.

Three eccentric members 3 are provided on the input rotating shaft 1 in an individually divided state. A key way 4 is formed in hollow portions of the eccentric members 3, and a key 4A is fittingly inserted into the key way 4. External gears 5 are respectively fitted around the eccentric members 3 via rollers 6. This external gear 5 has around an outer periphery thereof outer teeth 7 constituted by a trochoidal tooth profile. Furthermore, an internal gear 8 which also serves as an outer casing is held stationary in this illustrated example. The internal gear 8 has a circular-arc-shaped tooth profile constituted by external pins 9 internally meshing with the external gears 5. Each of the external gears 5 is provided with internal pin holes 10 into which internal pins 11 are respectively fitted with a play. An internal roller 12 is fitted with a play around an outer periphery of each of these internal pins 11, one end of the pin 11 being closely fitted with an internal pin retaining flange 13. This internal pin retaining flange 13 is formed integrally with the output shaft 2.

In the above-described known internally-meshing-type planetary reduction gear having the three external gears 5 and the three eccentric members 3, the eccentric members 3 are formed as a split type, and the respective eccentric members are disposed on a shaft by being offset 120° from each other.

However, with such a planetary gear system described above, the following problems are encounted.

Although the greater the number of the eccentric members and the external gears, the more advantageous in transmitting the torque, the installation work becomes complicated on the other hand.

In addition, since the arrangement is such that separate eccentric members are installed directly on the the input rotating shaft by means of a key or the like, it takes a long period of time and experienced skills in improving the installation accuracy. Moreover, there is the disadvantage that the eccentric members become out of phase during operation, with the result that engagement between the external and internal gears becomes unsmooth, and backlash is produced, enlarging the play.

SUMMARY OF THE INVENTION

Accordingly, it is a primary object of the present invention to provide a planetary gear system in which at least eccentric members are formed integrally as one component, thereby overcoming the above-described drawbacks of the prior art.

To this end, according to the present invention, there is provided a planetary gear system comprising: input or output means; at least three eccentric members which are juxtaposed axially with phases thereof being offset with each other and are operably connected to the input or output means; external gears respectively fitted around the eccentric members via rollers; an internal gear internally meshing with the external gears; at least one internal pin which is inserted with a play into at least one internal hole formed in each of the external gears; and a flange for retaining the internal pin, either one of the internal gear or the flange being held stationary, the other being coupled with the output or input means, wherein all of the eccentric members are formed as an integrated member.

In the planetary gear system in which all the eccentric members are formed integrally as one component, during assembly, it becomes difficult to fit rollers and external gears around the eccentric member disposed in the center, by overriding the eccentric member disposed at an end portion.

Therefore, it is another object of the present invention to provide a planetary gear system in which at least three eccentric members are formed integrally as one component, and which facilitates installation of rollers and external gears on all the eccentric members.

The above and other objects, features and advantages of the present invention will become apparent from the following description of the present invention when read in conjunction with the accompanying drawings.

DESCRIPTION OF THE PREFERRED EMBODIMENTS.

Figure 1:
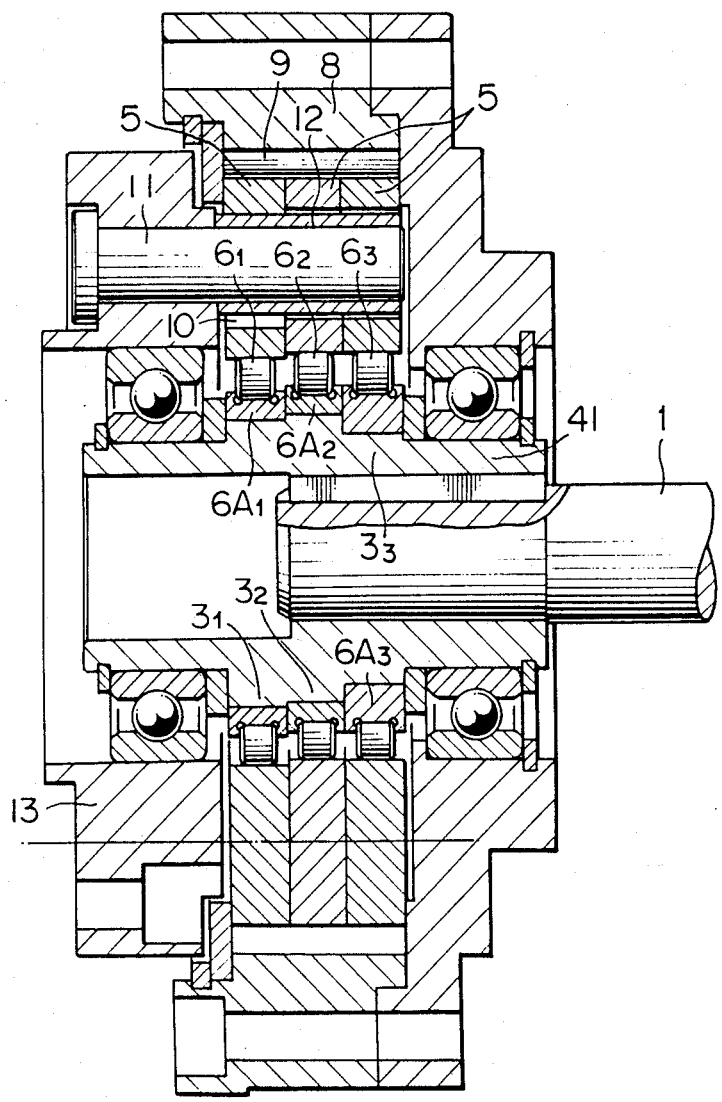
FIG. 1 is a cross-sectional view illustrating a first embodiment of the present invention.
Figure 2:
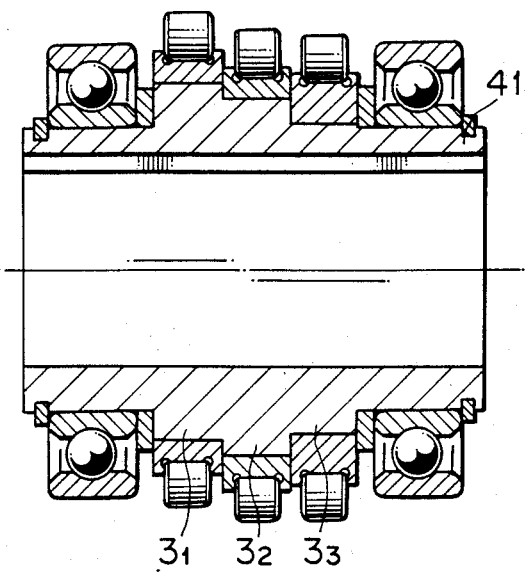
FIG. 2 is an enlarged cross-sectional view of a bearing portion having integrated eccentric members shown in FIG. 1.

FIG. 1 is a cross-sectional view of a first embodiment of the present invention; FIG. 2 is an enlarged cross-sectional view of an eccentric-member portion shown in FIG. 1; and FIG. 3 is a diagram illustrating the contours of the outer peripheries of the eccentric members.

Figure 6:
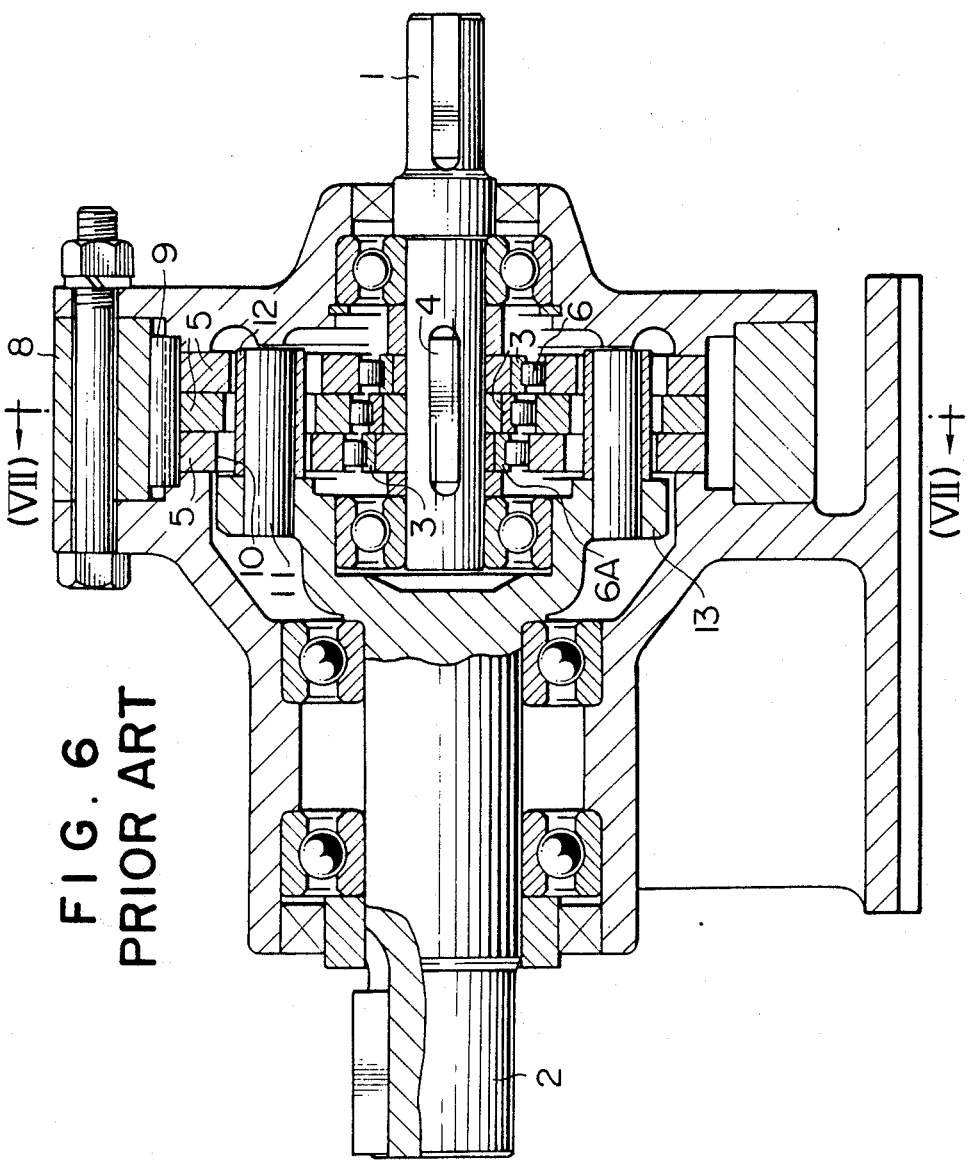
FIG. 6 is a cross-sectional view illustrating a conventionally known planetary reduction gear.
Figure 7:
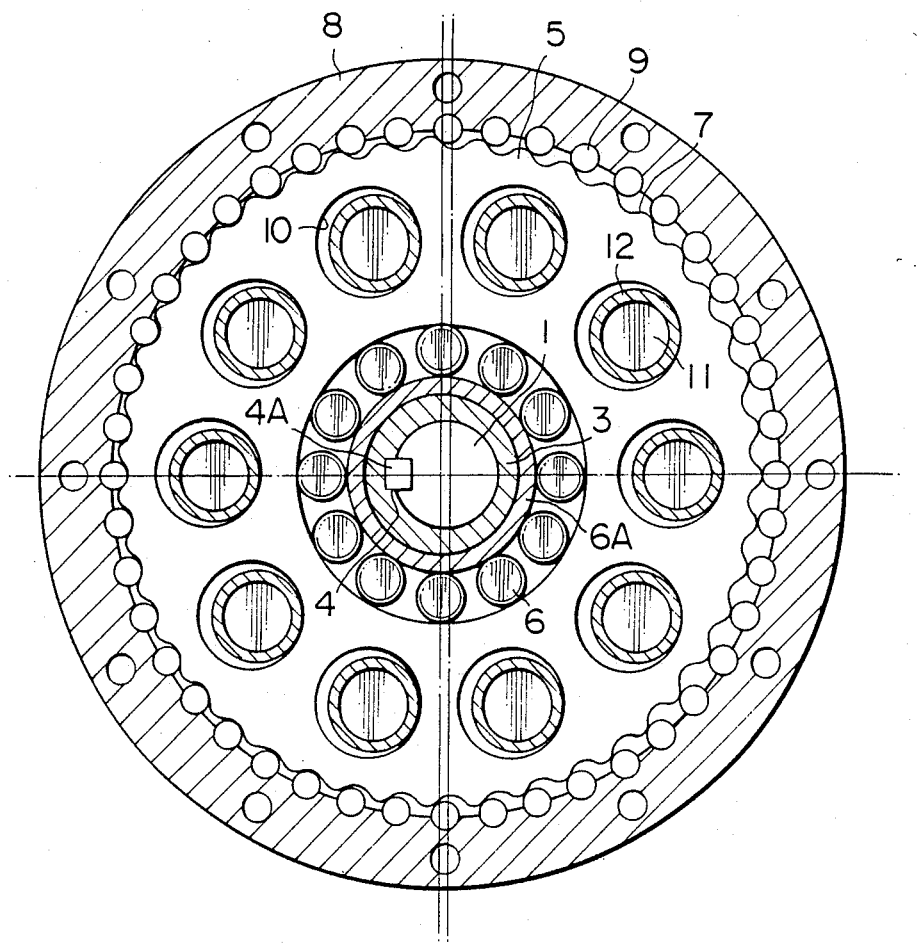
FIG. 7 is a cross-sectional view taken along the line VII—VII of FIG. 6.

In the following description, those portions or components that are identical with those of the conventionally known arrangement shown in FIGS. 6 and 7 are denoted by the same reference numerals.

An input rotating shaft 1 is inserted into and coupled with a hollow eccentric-member shaft 41. Two eccentric members $3_1$, $3_2$ nd a small-diameter eccentric member $3_3$ are formed integrally on this eccentric-member shaft 41 in that order from the end portion. The eccentric members $3_1$, $3_2$ and the small-diameter eccentric member $3_3$ are respectively provided with bearings $6_1$, $6_2$, $6_3$ having inner rings $6A_1$, $6A_2$, $6A_3$. The thickness of the inner ring $6A_3$ is made greater than that of the inner rings $6A_1$, $6A_2$. Three external gears 5 are respectively fitted around the eccentric members $3_1$, $3_2$ and the small-diameter eccentric member $3_3$ via the inner rings $6A_1$, $6A_2$, $6A_3$ and the bearings $6_1$, $6_2$, $6_3$. Each of these external gears 5 has on an outer periphery thereof external teeth having a trochoidal tooth profile. An internal gear 8 is formed integrally with a casing. The internal gear 8 has a circular-arc-shaped tooth profile constituted by external pins 9 which engage with the teeth of the external gear 5. This external pin 9 may be arranged with an external roller which is fitted with a play. The external gear 5 is provided with internal pin holes 10. An internal roller 12 is fitted with a play around the outer periphery of this internal pin 11, one end of the internal pin 11 being closely fitted with an internal pin retaining flange 13. The internal rollers 12 may be omitted. The internal pin retaining flange 13 is provided on an output shaft (not shown).

Figure 3:
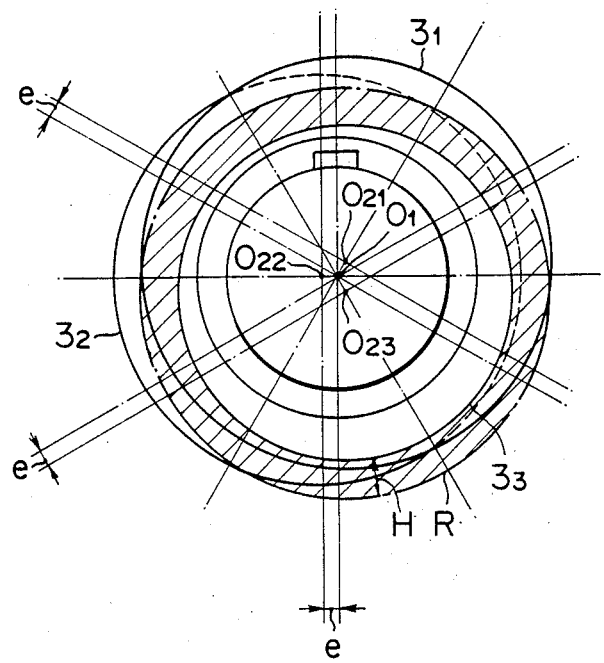
FIG. 3 is a diagram illustrating the contours of the outer peripheries of the three eccentric members shown in FIG. 3.

Referring also to FIG. 3, a detailed description will now be given of a structure of an eccentric-member shaft in accordance with the present invention.

In FIG. 3, the rotational center of the input rotating shaft is $O_1$, and the centers of the eccentric members are $O_{21}$, $O_{22}$, $O_{23}$ which are offset 120 degrees from each other with respect to the rotational center of the input rotating shaft. The eccentric members $3_1$, $3_2$ and the small-diameter eccentric member $3_3$ are integrally formed on the eccentric-member shaft 41 with the centers $O_{21}$, $O_{22}$, $O_{23}$ of the eccentric members as the centers. The centers $O_{21}$, $O_{22}$, $O_{23}$ of the eccentric members are respectively offset from the rotational center $O_1$ by e. The outer periphery of the small-diameter eccentric member $3_3$ should be essentially R indicated by the alternate long and short dashes line, but if there is an eccentric member having the size of this outer periphery R, it would become impossible to insert the inner peripheral ring $6A_2$ so as to be fit around the adjacent eccentric member $3_2$.

In this embodiment, therefore, the outer periphery of the small-diameter eccentric member $3_3$ is made small so that it is located inside the outer periphery of the eccentric member $3_2$. As a result, the inner peripheral ring $6A_2$ can be fitted around the eccentric member $3_2$ by overriding the small-diameter eccentric member $3_3$.

If the small-diameter eccentric member $3_3$ having a small radius is used as it is, its radius would be lacking with respect to the essential outer periphery R of the eccentric member. Hence, that lacking portion is compensated for by enlarging the thickness of the inner peripheral ring $6A_3$ in the radial direction thereof. Namely, the thickness of the inner peripheral ring $6A_3$ is made greater than those of the other inner peripheral rings $6A_1$, $6A_2$ by a difference H between the outer periphery of the small-diameter eccentric member $3_3$ and R.

Since this embodiment is arranged as described above, an assembly operation is carried out as described below.

In FIG. 1, the external gear 5, the rollers $6_1$, and the inner peripheral ring $6A_1$ are fitted to the eccentric member $3_1$ from the left-hand side of the eccentric-member shaft 41 as viewed in the drawing, while the external gear 5, the roller $6_2$, and the inner peripheral ring $6A_2$ are fitted to the eccentric member $3_2$ from the right-hand side of the drawing. The insertion of the inner peripheral ring $6A_2$ is done by overriding the small-diameter eccentric member $3_3$, but since the outer periphery of the small-diameter eccentric member $3_3$ is small, no hindrance is caused to the insertion of the inner peripheral ring $6A_2$.

Subsequently, the external gear 5, the roller $6_3$, and the inner peripheral ring $6A_3$ are fitted to the small-diameter eccentric member $3_3$.

In the above description, an explanation has been given on an assumption that the internal gear 8 is stationary integrally with the casing and the internal pin retaining flange 13 rotates. However, it will be appreciated that the present invention also includes an arrangement in which the internal pin retaining flange 13 is fixed, the internal gear 8 is made rotatable integrally with the casing, and an output is obtained from the internal gear 8.

In addition, the number of the external gears is not restricted to three, and it is possible to provide the arrangement of the small-diameter eccentric member at opposite ends of the system or to dispose two or more small-diameter eccentric members of this embodiment such as to be adjacent to each other, thereby allowing applications to the planetary gear system having four external gears. Thus, it goes without saying that the present invention is applicable to the planetary gear system having three or more external gears.

Figure 4:
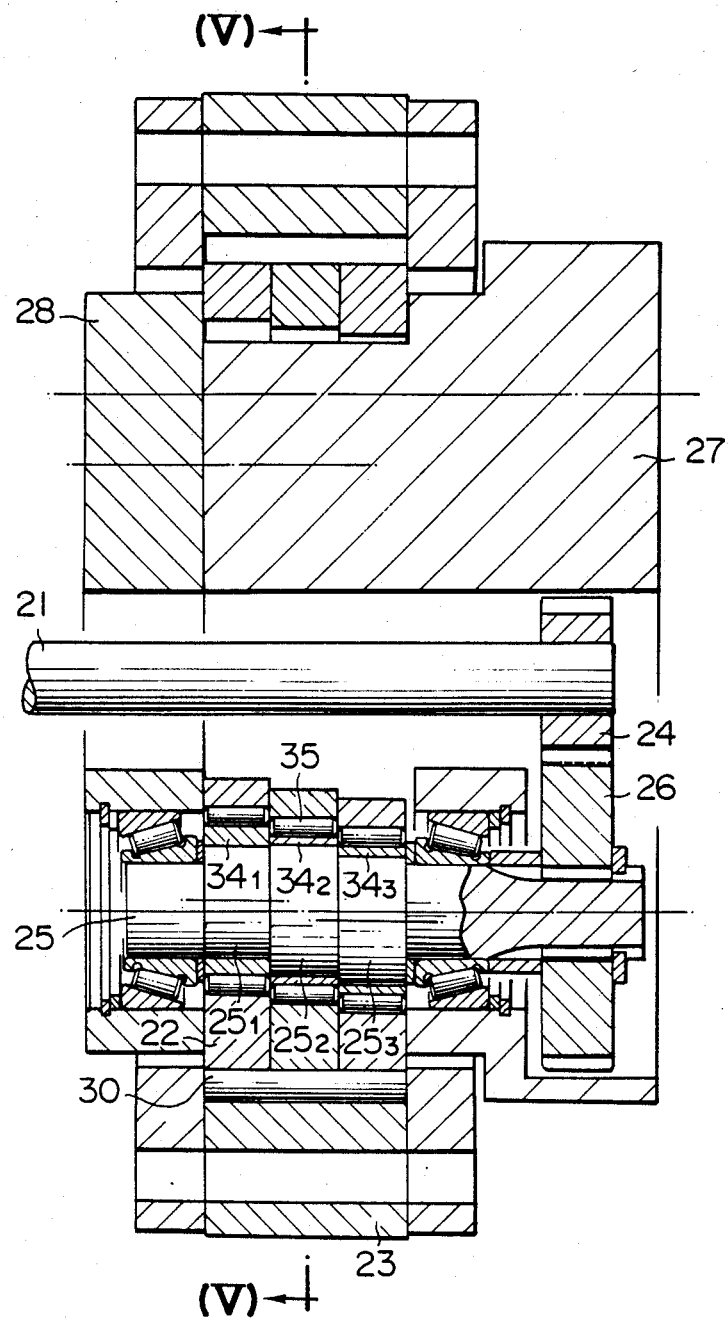
FIG. 4 is a cross-sectional view illustrating a second embodiment of the present invention.
Figure 5:
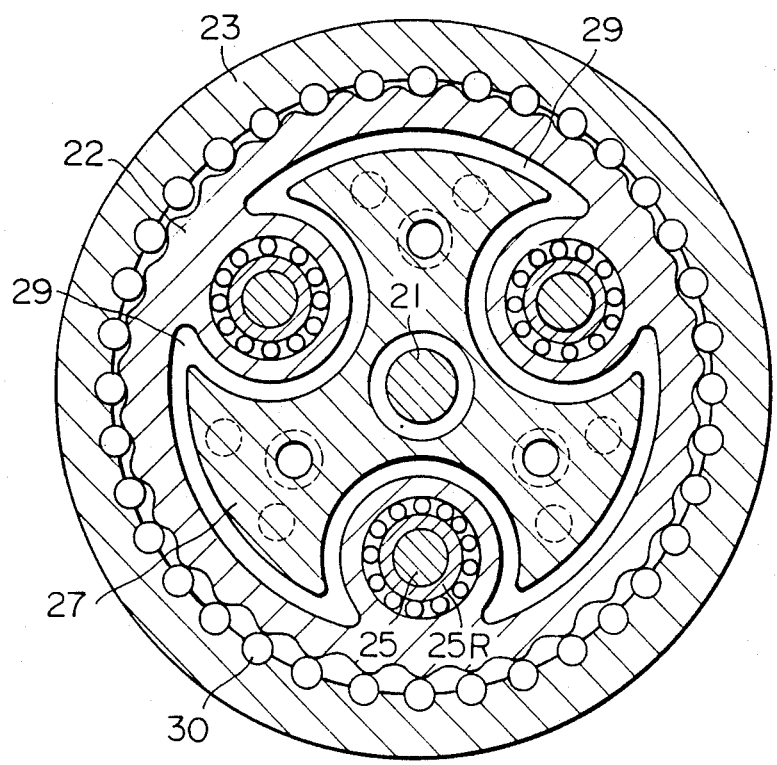
FIG. 5 is a cross-sectional view taken along the line V—V of FIG. 4.

FIG. 4 is a cross-sectional view illustrating a second embodiment of the present invention applied to an internally meshing planetary gear system of another type, while FIG. 5 is a cross-sectional view taken along the line V—V of FIG. 4.

Referring to FIGS. 4 and 5, although this reduction gear system is similar to the internally meshing planetary gear system illustrated in FIGS. 1 and 2, it differs from the same in the mechanism of swingably rotating an external gear 22 by the rotation of an input shaft 21 and in that the mechanism of taking out the output is so arranged as to take out the output rotation from an internal gear 23.

Namely, a front-stage-portion external gear 26 provided on an eccentric crankshaft 25 is rotated by a pinion 24 provided on the input shaft 21. The eccentric crankshaft 25 is provided with three eccentric members $25_1$, $25_2$, $25_3$, which are adapted to swingably rotate the external gears 22 via rollers 35 respectively having inner peripheral rings $34_1$, $34_2$, $34_3$. In this embodiment, three eccentric crankshafts 25 are pivotally supported by a fixed carrier 27 and a retaining plate 28. However, the number of the eccentric crankshafts 25 should not be restricted to three. In the external gear 22 is formed an opening 29 through which the carrier 27 is inserted. The teeth of the external gear 22 engage with external pins 30 provided on the internal gear 23 to rotate the internal gear 23 so as to reduce the rotational speed thereof.

Amongst the three eccentric members $25_1$, $25_2$, $25_3$ provided on the eccentric crankshaft 25, the outer periphery of the eccentric member $25_1$ at the left end as viewed in the drawing is of such a size that it is smaller than the outer periphery of the eccentric member $25_2$ in the center. In addition, the thickness of the inner peripheral ring $34_1$ at the left end is greater than those of the other inner peripheral rings $34_2$, $34_3$, thereby securing the outside diameter of the eccentric member $25_1$.

The above-described internally meshing planetary gear system in accordance with the embodiment shown in FIGS. 4 and 5 demonstrates the same effect as that of the internally meshing planetary gear system shown in FIGS. 1 and 2.

Obviously, the planetary gear system in accordance with the present invention includes not only an internally meshing planetary reduction gear but also an internally meshing overdrive gear since a reduction gear can be used as an overdrive gear if the output side and the input side thereof are reversed.

The advantages of the first and second embodiments thus arranged are as follows:

The installation of the rollers are the external gears on the planetary gear system is facilitated. In addition, since these members are arranged to be installed on one eccentric-member shaft, the accuracy of installation improves as compared with an arrangement in which the rollers and the external gears are installed on separate eccentric members.

Since the input rotating shaft can be inserted directly into a hollow eccentric-member shaft, a mechanism of introducing the input rotation can be simplified as compared with the arrangement in which separate eccentric members are installed on the input rotating shaft. In addition, since the outside diameter of the bearings are identical, there is an additional advantage in that the holes for the bearings of the external gears can be provided with the same diameters.

Figure 8:
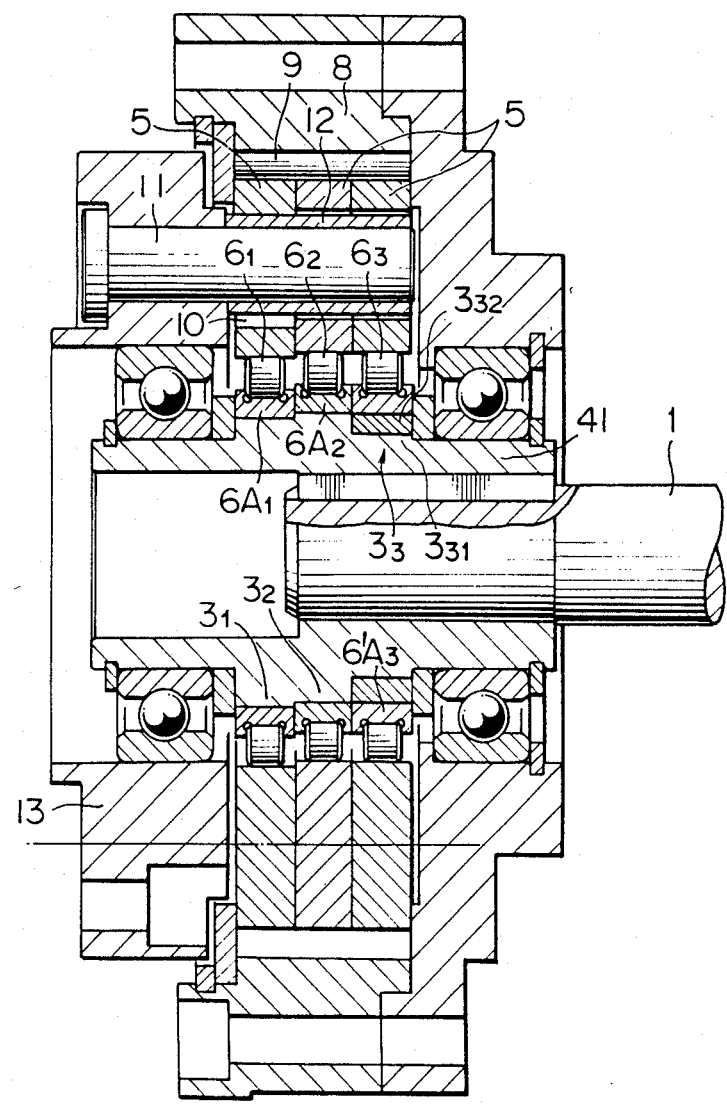
FIG. 8 is a cross-sectional view illustrating a third embodiment of the present invention.
Figure 9:
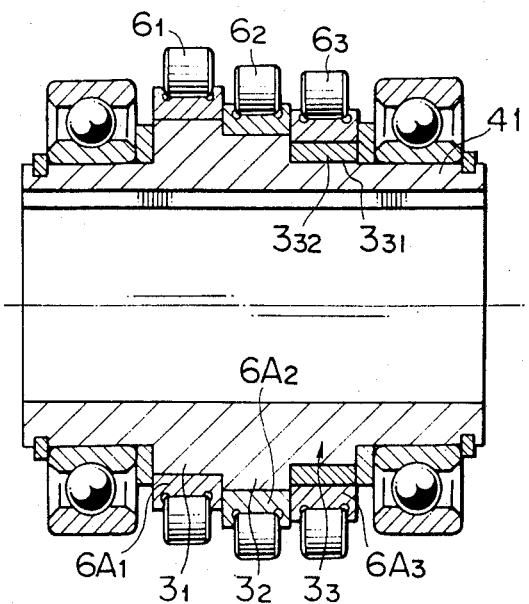
FIG. 9 is an enlarged cross-sectional view of the bearing portion having the integrated eccentric members shown in FIG. 8.
Figure 10:
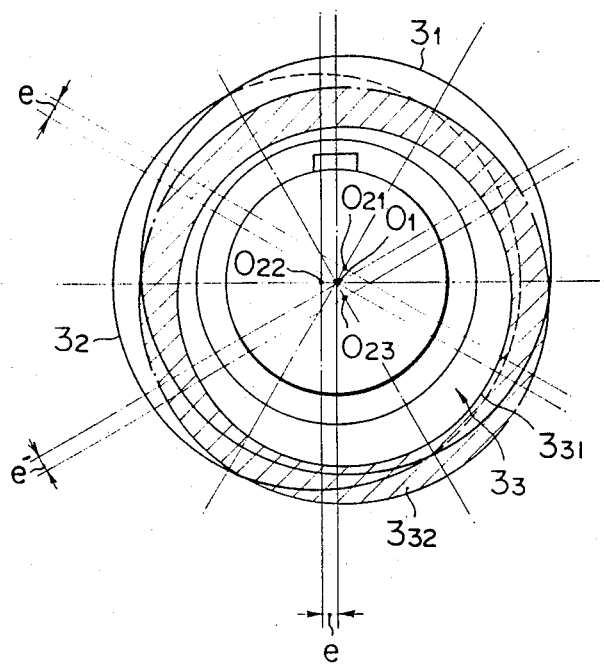
FIG. 10 is a diagram illustrating the contours of the outer peripheries of the three eccentric members shown in FIG. 8.

FIG. 8 is a cross-sectional view illustrating a third embodiment of the present invention; FIG. 9 is an enlarged cross-sectional view of the eccentric-member shaft shown in FIG. 8; and FIG. 10 is a diagram illustrating the contours of the outer periphery of the eccentric members.

In the description given below, those components that are identical with those of the arrangement of the first embodiment shown in FIG. 1 are denoted by the same reference numerals.

The input rotating shaft 1 is inserted into a hollow eccentric-member shaft 41. On this eccentric-member shaft 41 are formed with three eccentric members $3_1$, $3_2$, $3_3$ consecutively in that order from an end portion thereof. The eccentric members $3_1$, $3_2$, $3_3$ are provided with the rollers $6_1$, $6_2$, $6_3$ having the inner peripheral rings $6A_1$, $6A_2$ and an inner peripheral ring $6'A_3$. The three external gears are respectively fitted around the eccentric members $3_1$, $3_2$, $3_3$ via the inner peripheral rings $6A_1$, $6A_2$, $6'A_3$ and the rollers $6_1$, $6_2$, $6_3$. Each of these external gears 5 has on an outer periphery thereof external teeth having a trochoidal tooth profile. The internal gear 8 is formed integrally with the casing. In addition, the internal gear 8 has a circular-arc-shaped tooth profile formed by the external pins 9 which engage with the teeth of the external gears 5. Each of these external pins 9 may be arranged with an external roller which is fitted therewith with a play. Each of the external gears 5 is provided with internal pin holes 10. The internal roller 12 is fitted with a play around the outer periphery of this internal pin 11, one end of the internal pin 11 being closely fitted with the internal pin retaining flange 13. The internal rollers 12 may be omitted. The internal pin retaining flange 13 is provided on an output shaft (not shown).

The arrangement described above is similar to that of the planetary gear system shown in FIG. 1; however, in this embodiment, the eccentric member $3_3$ is constituted by a small-diameter portion $3_{31}$ and a spacer ring $3_{32}$.

Referring also to FIG. 10, a detailed description will now be given of a structure of the eccentric-member shaft in accordance with the present invention.

In FIG. 10, the rotational center of the input rotating shaft is $O_1$, and the centers of the eccentric members are $O_{21}$, $O_{22}$, $O_{23}$ which are offset 120 degrees from each other with respect to the rotational center O of the input rotating shaft. The contours of the outer peripheries of the eccentric members $3_1$, $3_2$, $3_3$ are integrally formed on the eccentric-member shaft 41 with the centers $O_{21}$, $O_{22}$, $O_{23}$ of the eccentric members as the centers. The centers $O_{21}$, $O_{22}$, $O_{23}$ of the eccentric members are respectively offset from the rotational center $O_1$ by e. Of these eccentric members, the eccentric member $3_3$ is constituted by the small-diameter portion $3_{31}$ and the spacer ring $3_{32}$ provided on an outer periphery thereof. The outer periphery of the small-diameter portion $3_{31}$ is made smaller than the outer periphery of the adjacent eccentric member $3_2$. The reason why this small-diameter portion is provided is that if there is an eccentric member whose size is equivalent to the outer periphery of the spacer ring $3_{32}$, it becomes impossible to fit the inner peripheral ring $6A_2$ around the adjacent eccentric member $3_2$. In the present invention, since the small-diameter portion $3_{31}$ is made small, the inner peripheral ring $6A_2$ can be fitted to the eccentric member $3_2$ by overriding the small-diameter portion $3_{31}$.

Since this embodiment is arranged as described above, an assembly operation is carried out as described below.

The external gear 5, the rollers $6_1$, and the inner peripheral ring $6A_1$ are fitted to the eccentric member $3_1$ from the left-hand side of the eccentric-member shafter 41 as viewed in the drawing, while the external gear 5, the roller $6_2$, and the inner peripheral ring $6A_2$ are fitted to the eccentric member $3_2$ from the ring-hand side of the drawing. The insertion of the inner peripheral ring $6A_2$ is done by overriding the small-diameter portion $3_{31}$, but since the outer periphery of the small-diameter portion $3_{31}$ is small, no hindrance is caused to the insertion of the inner peripheral ring $6A_2$.

Subsequently, th spacer ring $3_{32}$ is fitted around the outer periphery of the small-diameter portion $3_{31}$, and the external gear 5, the rollers $6_3$, the inner peripheral ring $6'A_3$ are fitted to the outer periphery of the spacer ring $3_{32}$.

The number of the external gears is not restricted to three, and it is possible to provide the arrangement of the small-diameter portion and the spacer ring in accordance with this embodiment at opposite ends and to provide a combination of the small-diameter portion and the spacer ring in accordance with this embodiment continuously to two or more adjacent eccentric members, thereby allowing applications to the planetary gear system having four external gears. Thus, this embodiment is applicable to the planetary gear system having three or more external gears, in the same way as the first embodiment.

Figure 11:
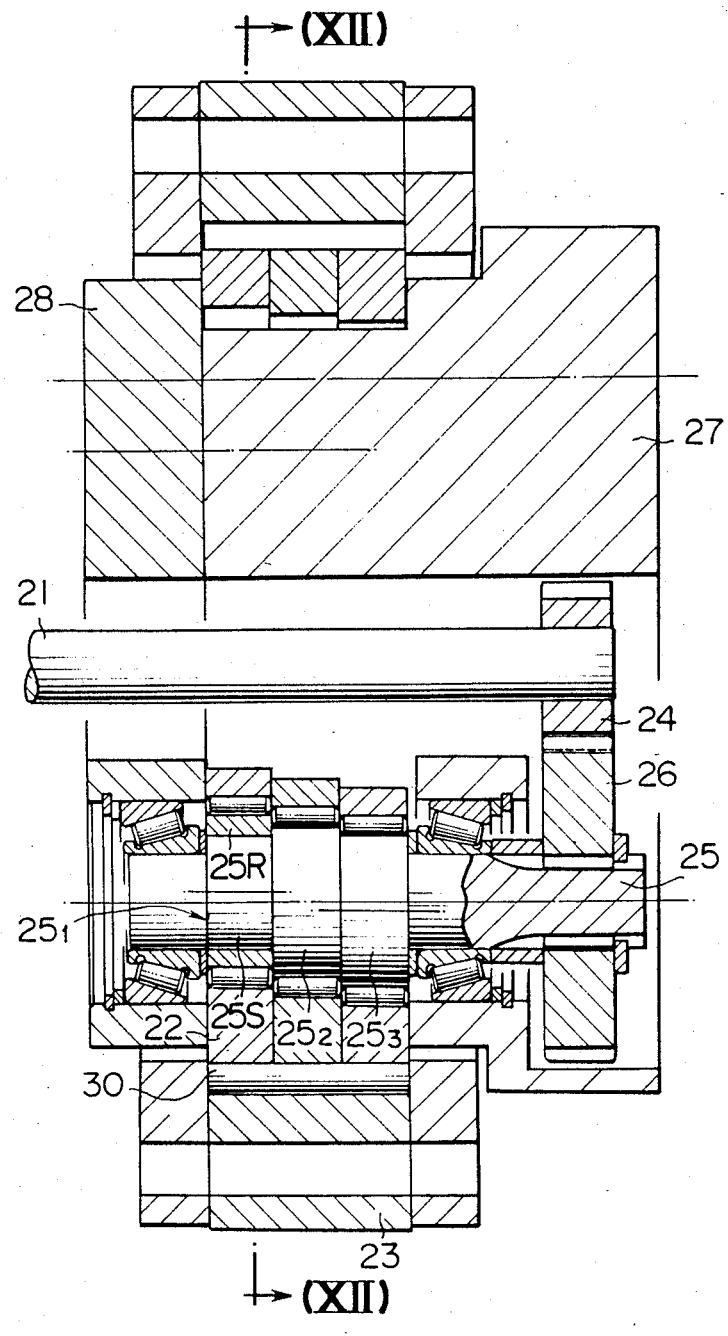
FIG. 11 is a cross-sectional view illustrating a fourth embodiment of the present invention.
Figure 12:
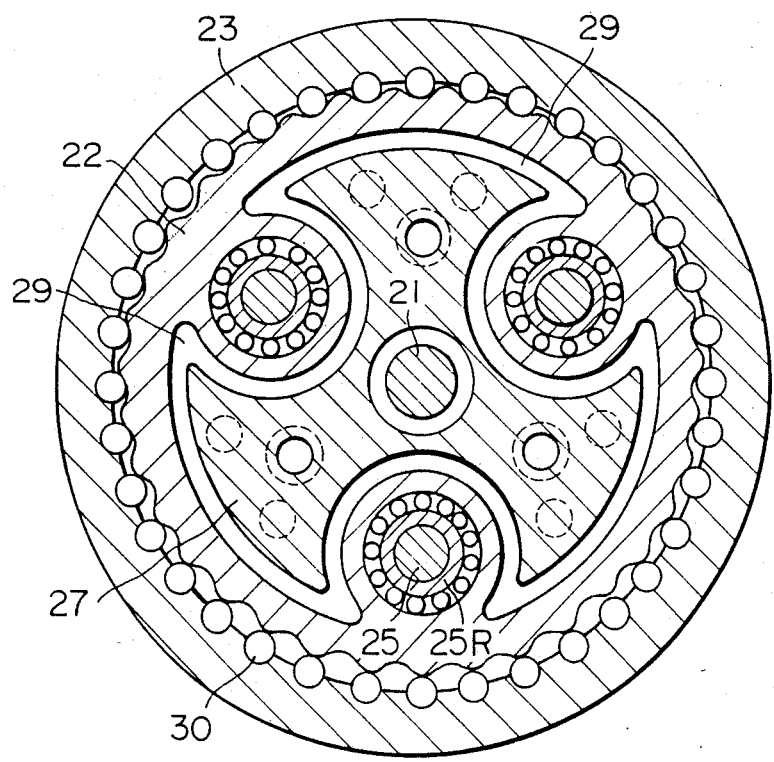
FIG. 12 is a cross-sectional view taken along the line XII—XII of FIG. 11.

Referring now to FIGS. 11 and 12, a description will now be made of a fourth embodiment in which the method of the third embodiment shown in FIG. 3 is applied to the internally meshing planetary gear system shown in FIGS. 4 and 5. Incidentally, components that are identical with those shown in FIGS. 4 and 5 are denoted by the same reference numerals.

The front-stage-portion external gear 26 provided on the eccentric crankshaft 25 is rotated by the pinion 24 provided on the input shaft 21. The eccentric crankshaft 25 is provided integrally with three eccentric members $25_1$, $25_2$, $25_3$. The external gear 22 is swingably rotated via these eccentric members $25_1$, $25_2$, $25_3$. Three eccentric crankshafts 25 are pivotally supported by the fixed carrier 27 and the retaining plate 28. In the external gear 22 is formed the opening 29 through which the carrier 27 is inserted. The teeth of the external gear 22 engage with external pins 30 provided on the internal gear 23 to rotate the internal gear 23 so as to reduce the rotational speed thereof.

In this embodiment, of the eccentric members $25_1$, $25_2$, $25_3$, the eccentric member $25_1$ at the extreme end is constituted by a small-diameter portion 25S and a spacer ring 25R provided around an outer periphery thereof, and the outer periphery of the small-diameter portion 25S is smaller than the outer periphery of the adjacent eccentric member $25_2$.

In this embodiment as well, it will be appreciated that it is possible to install the inner peripheral ring around the eccentric member $25_2$ in the center by overriding the eccentric member $25_1$ at the extreme end, in the same way as the embodiment shown in FIG. 8.

Figure 13:
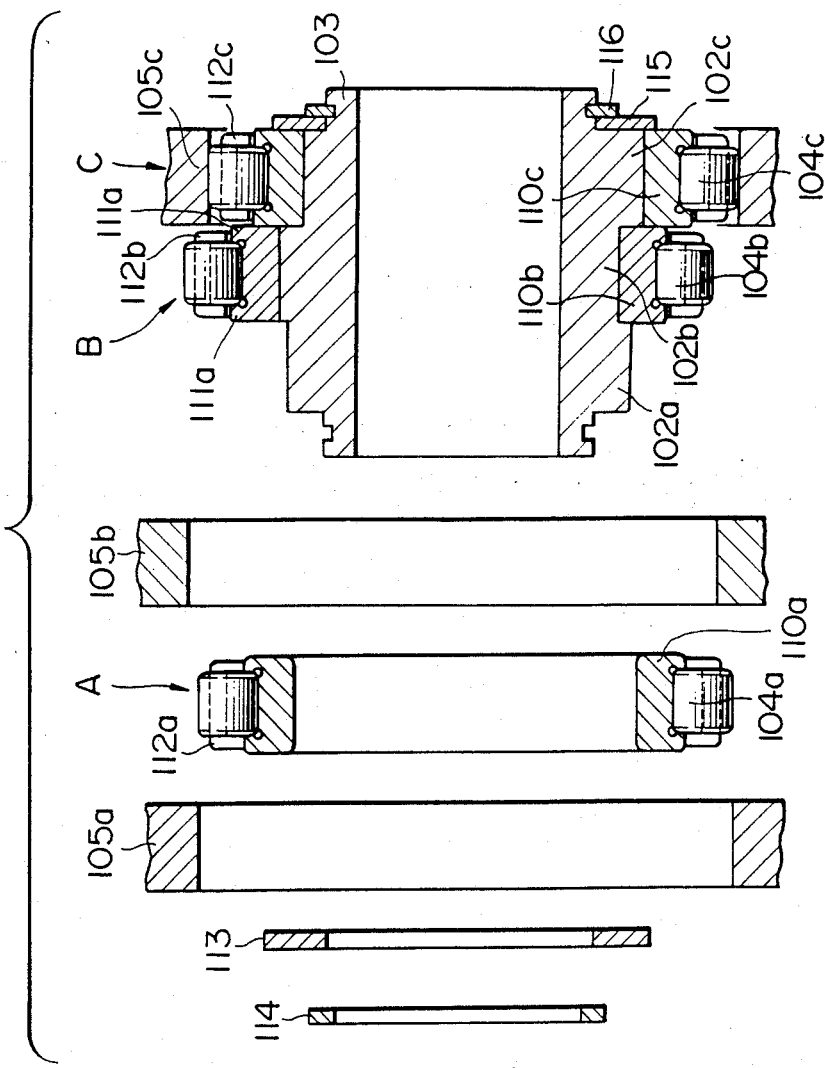
FIG. 13 is an exploded view illustrating an ordinary structure of an outer-ring-split-type bearing used in the planetary reduction gear to which the present invention is applicable.

The inner peripheral ring has flanges respectively projecting radially outwardly from the opposite ends thereof. Since the rollers are fitted between these flanges, the rollers must be removed from the eccentric member together with the inner peripheral ring. Accordingly, it is extremely troublesome to remove the external gear fitted to the eccentric member in the center. FIG. 13 is an exploded view to explain this situation.

Inner peripheral rings 110a, 110b, 110c are respectively fitted around eccentric members 102a, 102b, 102c provided on an eccentric-member shaft 103. Each of the inner peripheral rings 110a, 110b, 110c has flanges integrally projecting from both sides thereof. A plurality of cylindrical rollers 104a, 104b, 105c are provided rotatably between external gears 105a, 105b, 105c, which also serve as outer rings, and the inner peripheral rings 110a, 110b, 110c. The cylindrical rollers 104a, 104b, 104c are disposed rotatably in such a manner as to maintain intervals between each other by means of retainers 112a, 112b, 112c.

In addition, the roller bearings A, C respectively disposed at opposite ends are retained by retaining rings 113, 114, 115, 116 fitted to the eccentric-member shaft 103.

However, with the outer-ring-split-type roller bearing of the above-described arrangement, the following problem has been encountered.

Namely, the cylindrical rollers 104a (104b, 104c), the retainers 112a (112b, 112c), and the inner peripheral ring 110a (110b, 110c) are formed integrally. For this reason, if the external gear 5b, which serves as the outer ring for the roller bearing B interposed between the two roller bearings among a plurality of the roller bearings A, B, C, is to be removed for repair or the like, the inner ring 110a (or the inner ring 110c) of the outer roller bearing A (or the roller bearing C) must be removed from the eccentric-member shaft 103, so that disassembly has been disadvantageously troublesome.

With reference to FIGS. 14 to 17, a description will be given of a fifth embodiment which overcomes the above-described problem.

Figure 14:
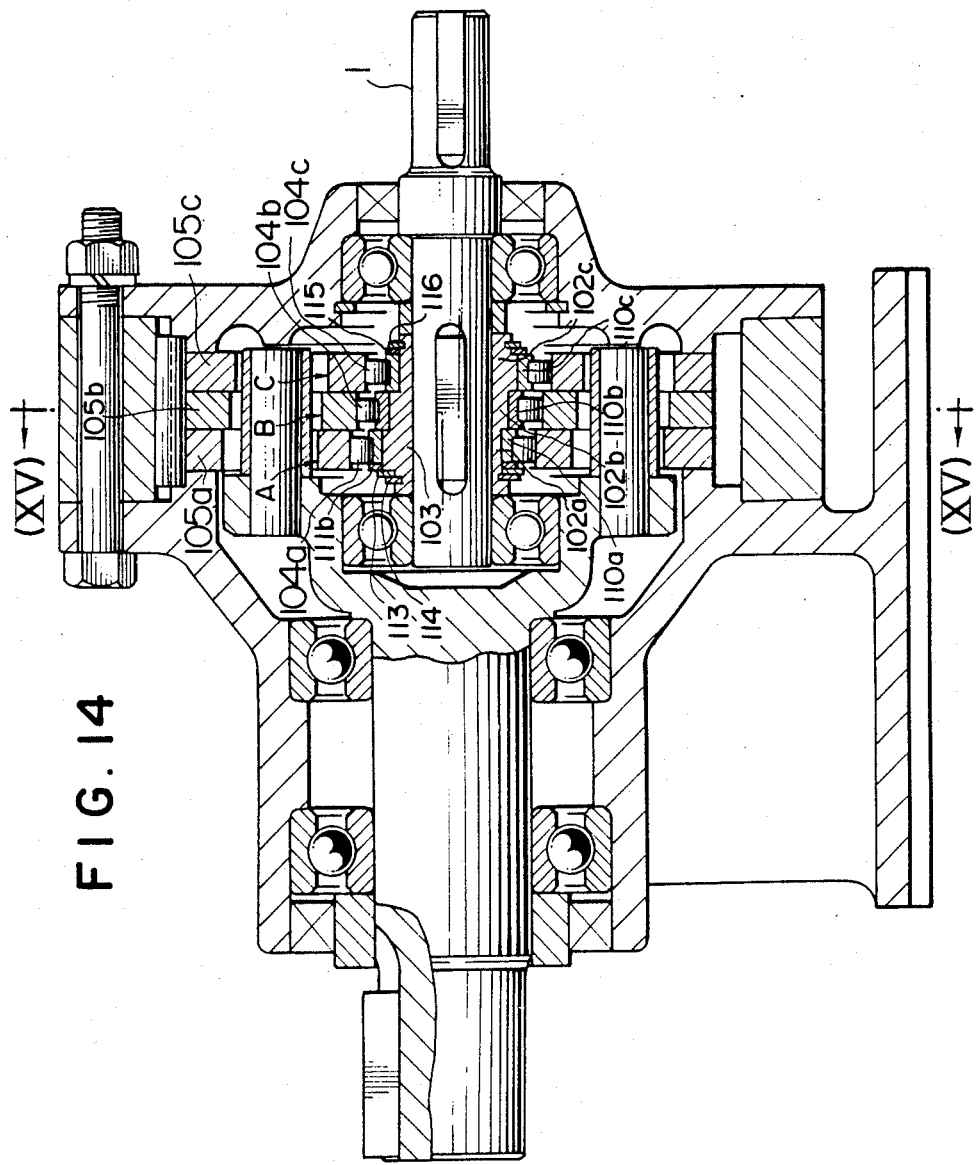
FIG. 14 is a cross-sectional view of a fifth embodiment of the present invention using the outer-ring-split-type bearing.
Figure 15:
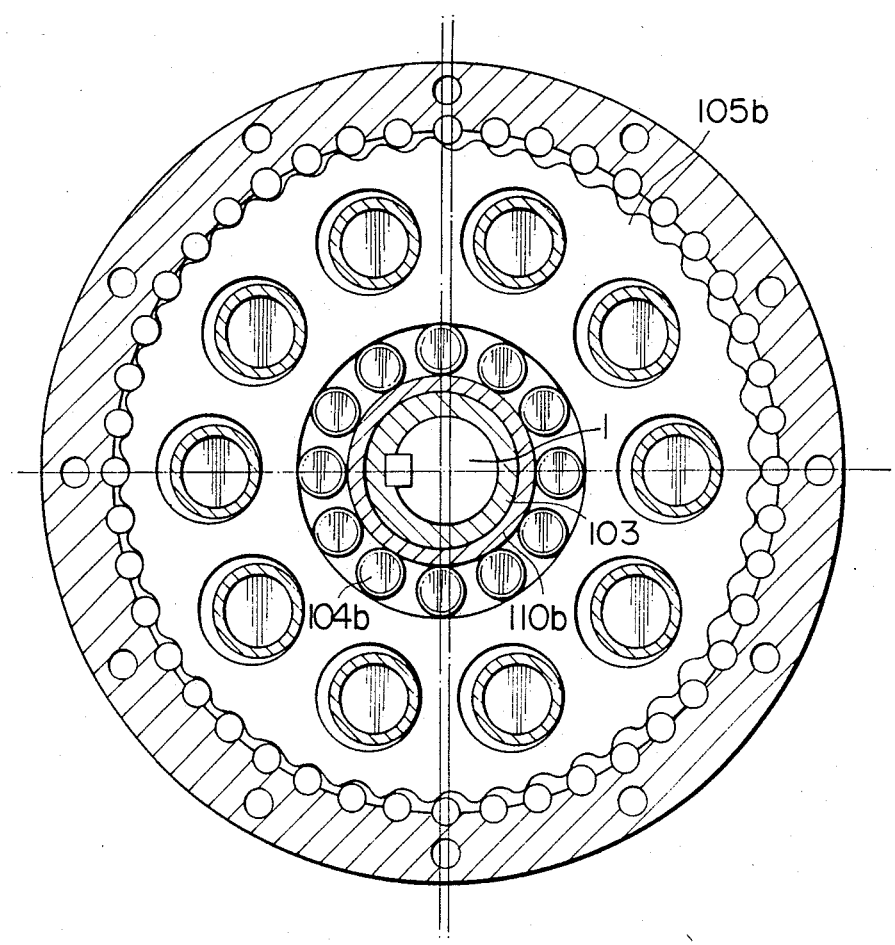
FIG. 15 is a cross-sectional view taken along the line XV—XV of FIG. 14.

Referring to FIGS. 14 and 15, the input shaft 1 is fitted into the hollow eccentric-member 103, and the three eccentric members 102a, 102b, 102c are provided integrally on the eccentric-member shaft 103 with their phases offset from each other (120° in this embodiment).

In this planetary gear system, the three roller bearings A, B, C constituted by the cylindrical rollers 104a, 104b, 104c, the inner peripheral rings 110a, 110b, 110c, and the retainers 112a, 112b, 112c are juxtaposed. In the roller bearings A, B, C, the external gears 105a, 105b, 105c also serve as the outer rings.

The other arrangements and operation of this planetary gear system are the same as those of the first and third embodiments.

Figure 16:
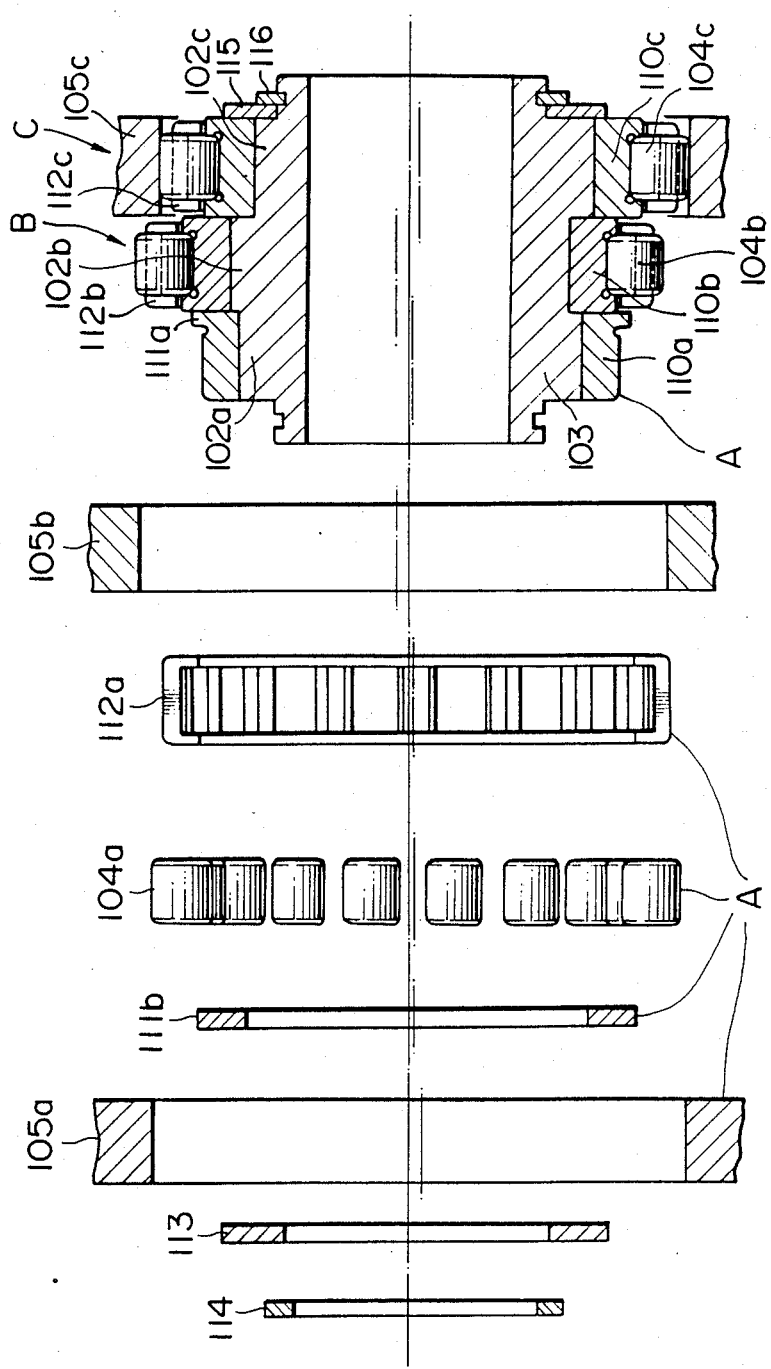
FIG. 16 is an exploded view of the eccentric-member bearing portion shown in FIG. 14.
Figure 17:
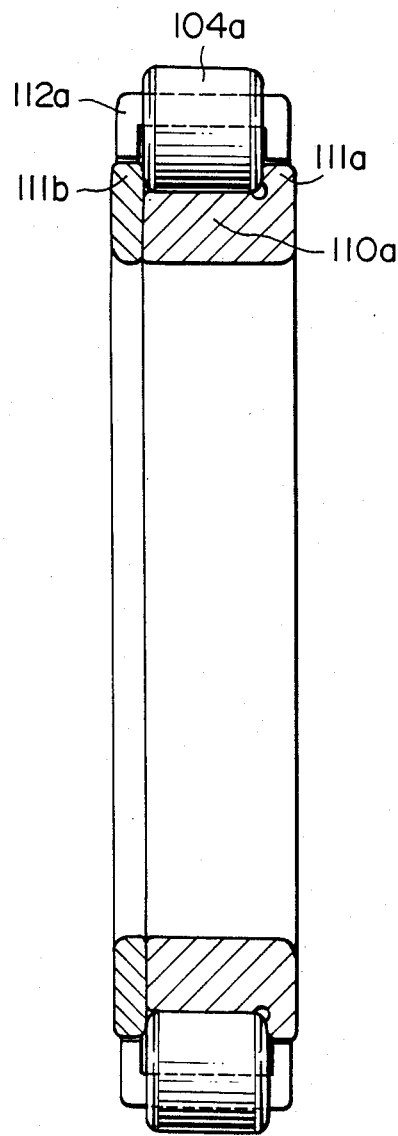
FIG. 17 is a vertical cross-sectional view illustrating a state in which the bearing A shown in FIG. 16 is assembled.

Referring also to FIGS. 16 and 17, a detailed description will be given of the outer-ring-split type bearing, which is an essential portion in this embodiment.

The inner peripheral rings 110a, 110b, 110c are respectively fitted around the eccentric members 102a, 102b, 102c of the eccentric-member shaft 103, and are retained by the retaining rings 113, 114, 115, 116 provided on both sides thereof, respectively. The cylindrical rollers 104a, 104b, 104c are provided between the external gears 105a, 105b, 105c, which also serve as outer rings, and the inner peripheral rings 110a, 110b, 110c. The cylindrical rollers 104a, 104b, 104c are provided rotatably while maintaining intervals between each other by the retainers 112a, 112b, 112c.

In this embodiment, the outer side one of flanges 111a projecting radially outwardly from both sides of the inner peripheral ring 110a (or the inner peripheral ring 110c) of the roller bearing A at the end, amongst the three roller bearings, is formed as an annular flange member 111b such as to be separable. This annular flange 111b in an installed state is brought into pressure contact with the inner peripheral ring 110a by the retainers 113, 114 and is thereby secured.

A description will be given hereafter of an operation of removing the roller bearings thus constructed in accordance with this embodiment.

FIG. 16 shows a case in which, during repair or the like, an attempt is made to remove the external gear 105b corresponding to the outer ring of the roller bearing B which is placed in the center.

After the retaining rings 113, 114 are removed, the external gear 105a is removed, and the outwardly disposed flange 111b of the roller bearing A is removed. Subsequently, the cylindrical bearings 104a and the retainer 112a are removed in the axial direction.

Since the inside diameter of the external gear 105b is greater than the outside diameter of the annular flange 111a of the inner peripheral ring 110a, the external gear 105b can be removed without needing to remove the inner peripheral ring 110a disposed on the outer side.

In accordance with this embodiment, the planetary gear system having outer-ring-split-type roller bearings comprises: inner peripheral rings which are respectively fitted around a plurality of eccentric members disposed on an input shaft and are provided with flanges projecting from opposite sides thereof; a plurality of rollers disposed rotatably between the flanges via retainers; and external gears which are fitted with the inner peripheral rings via the rollers and which also serve as outer rings, wherein one of the flanges projecting from opposite sides of the inner peripheral ring is separably provided. Consequently, the external gear can be removed without needing to remove the inner peripheral ring, so that the work efficiency is improved, and the installation work can be expedited.

Figure 18:
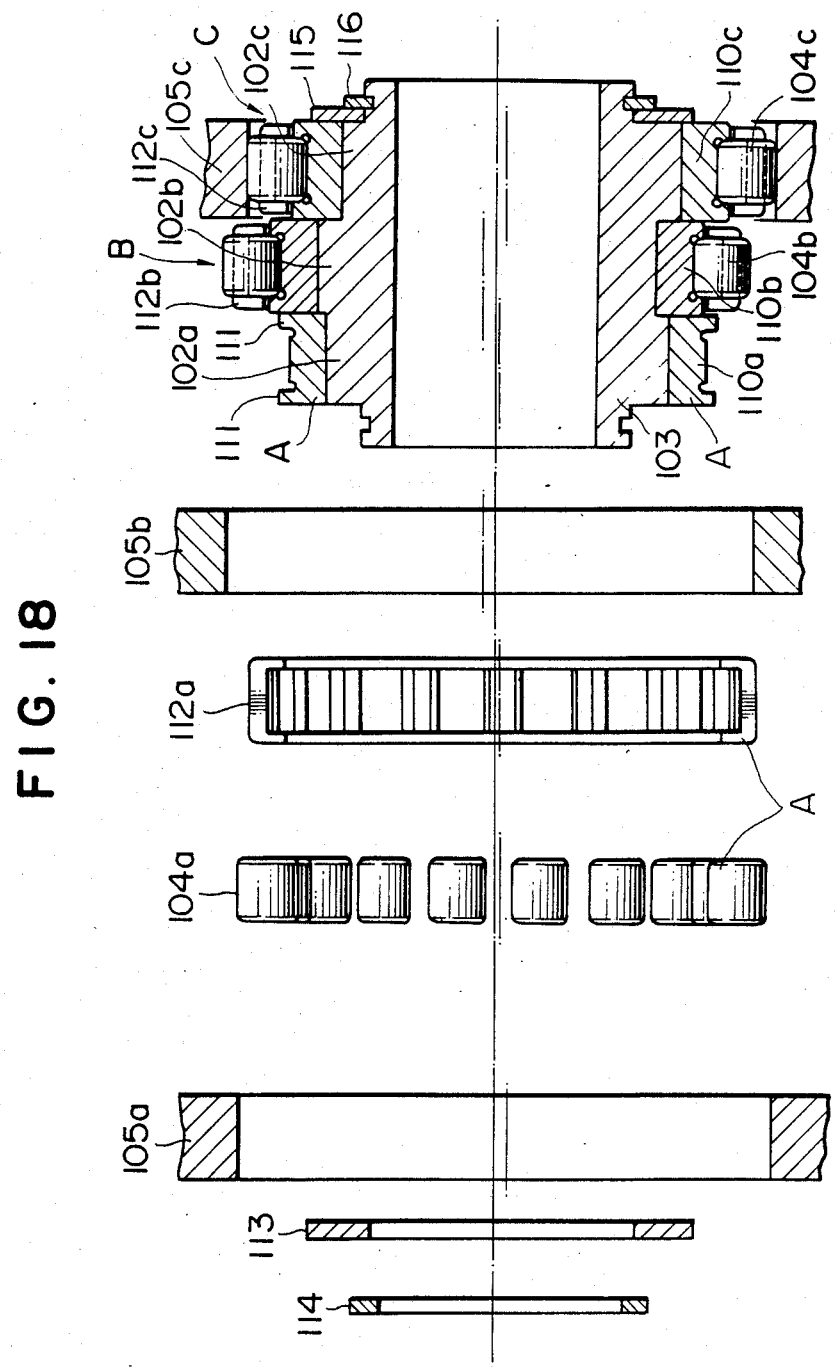
FIG. 18 is an exploded view of the eccentric-member bearing portion in accordance with a sixth embodiment of the present invention.
Figure 19:
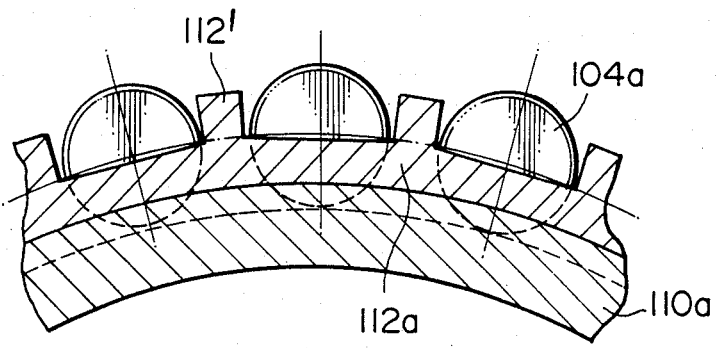
FIG. 19 is a horizontal cross-sectional view of the bearing A shown in FIG. 18.
Figure 20:
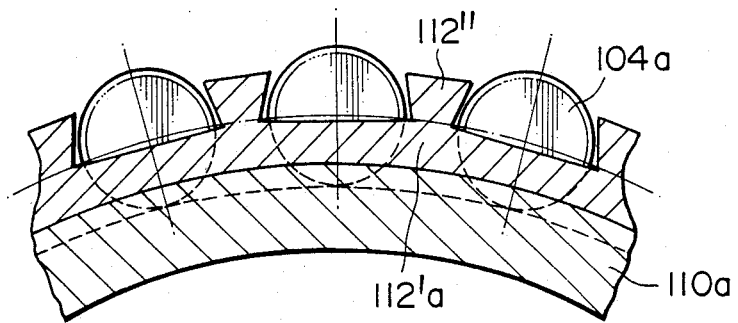
FIG. 20 is a horizontal cross-sectional view of a conventional bearing.

FIG. 18 is an exploded view illustrating a method of disassembling and assembling an eccentric-member bearing portion in the other embodiment (the sixth embodiment) which allows the external gear to be removed from the central eccentric member without needing to remove the inner peripheral ring from the eccentric member disposed at the end. FIG. 19 is a transverse sectional view of the roller bearing used in that embodiment. The conventional roller bearing has a transverse cross section as shown in FIG. 20. Retainers 112'a provided on the inner peripheral ring 110a respectively have partition walls 112" for holding a multiplicity of rollers 104a at predetermined intervals. Each of these partition walse 112" has a sectional configuration which diverges radially outwardly to ensure that the rollers 104a will not come off radially outwardly. Accordingly, to remove the external gear placed in the center for the purpose of repair or the like, it has been necessary to remove the inner peripheral ring of the roller bearing disposed on the outer side thereof from the eccentric member, so that it has been troublesome in disassembly. This embodiment overcomes this problem in a method which is different from the fifth embodiment shown in FIGS. 14 to 17.

Referring now to FIGS. 18 and 19, the outer-ring-split-type roller bearing in accordance with this embodiment will be described in detail.

The inner peripheral rings 110a, 110b, 110c are respectively fitted around the eccentric members 102a, 102b, 102c of the eccentric-member shaft 103, and the flanges 111 are provided on both sides of the respective inner peripheral rings 110a, 110b, 110c. The cylindrical rollers 104a, 104b, 104c are respectively provided between the external gears 105a, 105b, 105c, which also serve as outer rings, and the inner peripheral rings 110a, 110b, 110c, the cylindrical rollers 104a, 104b, 104c being adapted to be rotatable while maintaining intervals between the adjacent ones thereof by the retainers 112a, 112b, 112c. At the same time, of the three roller bearings, the roller bearings A, C located at the opposite end portions are retained by the retainers 113, 114, 115, 116 fitted to the eccentric-member shaft 103.

In this embodiment, of the three roller bearings A, B, C, the upper half of each partition portion 112' of the retainer 112a of the roller bearing A at the end portion (or it may be that of the retainer 112c of the roller bearing C) has a rectangular cross section to allow rollers 104a to come off radially (see FIG. 19).

It should be noted that the structure for permitting each of the rollers 104a to come off the retainers is not restricted to the above-described embodiment.

In addition, it is not absolutely necessary for the rollers 104a to come off completely, and it suffices if the rollers 104a can move radially to such an extent that the retainers and the rollers can be drawn out with the inner peripheral ring secured, as will be described later.

A description will now be given of an operation of removing the roller bearings thus constructed in accordance with this embodiment.

A case will be described in which an attempt is made to remove the external gear 105b corresponding to the outer ring of the roller bearing B placed in the center for the purpose of repair or the like.

As shown in FIG. 18, after removing the retaining rings 113, 114, the external gear 105a is removed The cylindrical rollers 104a are then pulled out in the radial direction.

Subsequently, the retainers 112a are removed in the axial direction.

Since the inside diameter of the external gear 105 is greater than the outside diameter of the inner peripheral ring 110a, the external gear 105b can be removed without needing to remove the inner peripheral ring 110a disposed on the outer side from the eccentric-member shaft 3.

Referring now to FIGS. 21 to 25, a seventh embodiment of the present invention will be described.

Figure 21:
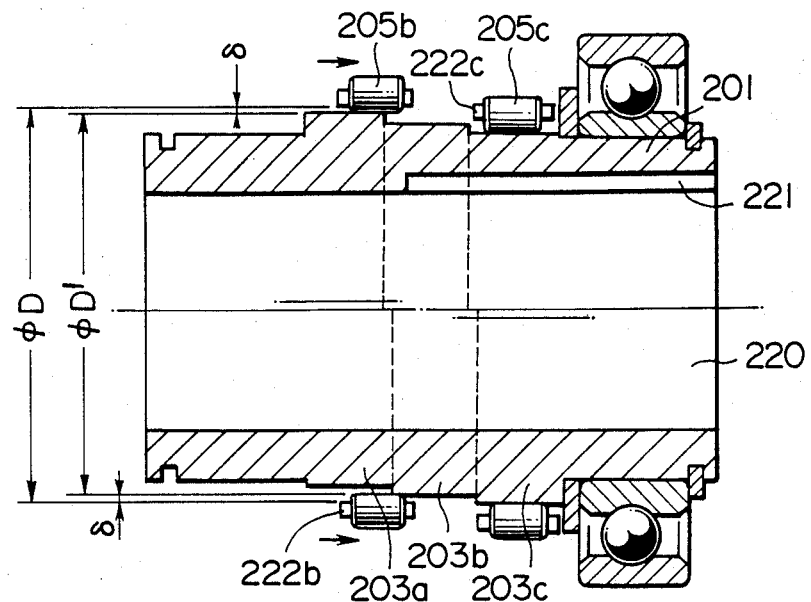
FIG. 21 is a cross-sectional view illustrating the manner in which the bearing in accordance with a seventh embodiment of the present invention is installed on a eccentric-member shaft.
Figure 23:
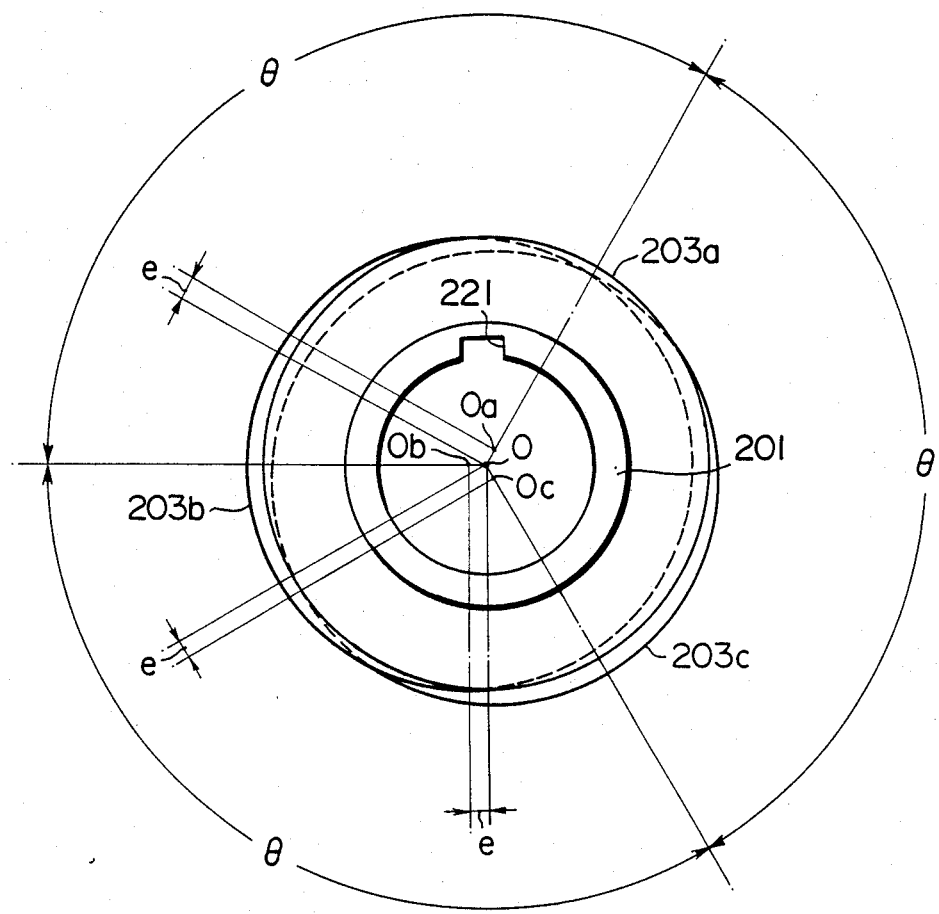
FIG. 23 is a side elevational view of the three eccentric members integrally installed on the eccentric-member shaft.
Figure 24:
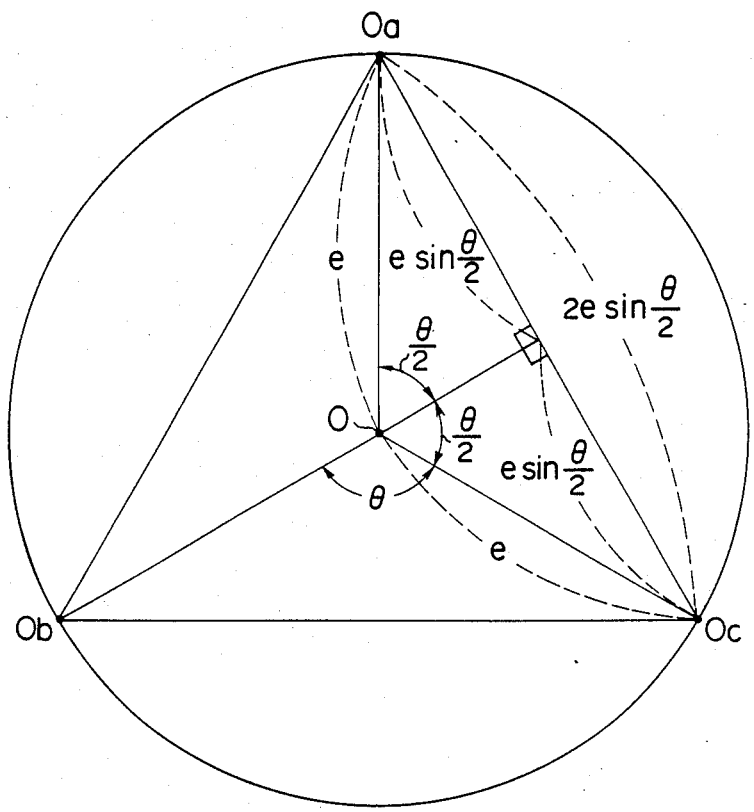
FIG. 24 is a diagram illustrating the relationships between the distance between the centers of adjacent eccentric members on the one hand, and amounts of the eccentric members and the phase difference on the other.

Referring to FIG. 21, a hollow portion 220 into which a shaft or the like (not shown) of a motor is fitted is formed in an eccentric-member shaft 201. An engaging means 221, such as a key way or a spline, for securing the shaft and the like of the motor is formed in the hollow portion 220. In addition, three eccentric members 203a, 203b, 203c are formed integrally on the eccentric-member shaft 201 in such a manner that their phases are offset from each other by $\theta$ (120° in this embodiment), as shown in FIG. 23.

Figure 25:
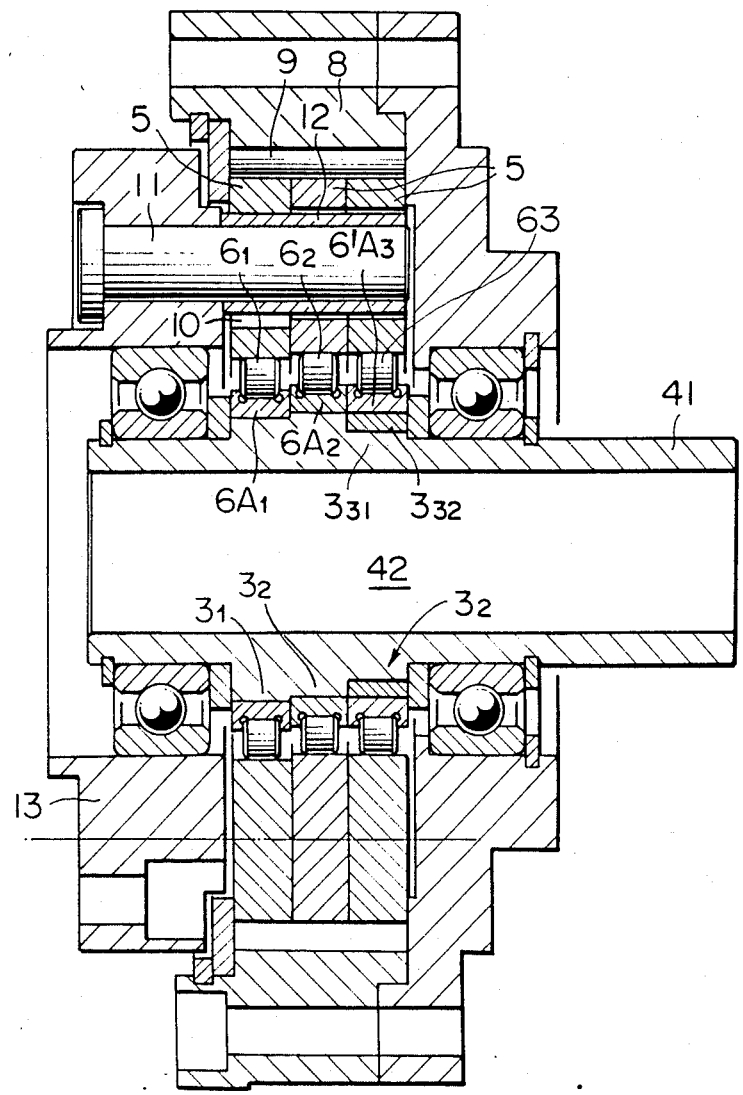
FIG. 25 is a cross-sectional view of a modification of the third embodiment of the present invention in which the eccentric-member shaft is made into a hollow shaft over the entire length thereof.

The rollers 205a, 205b, 205c, such as the cylindrical rollers, needle rollers, and balls, retained by retainers 222a, 222b, 222c are respectively fitted around the eccentric members 203a, 203b, 203c formed on the eccentric-member shaft 201. In addition, as shown in FIG. 25, external gears 206a, 206b, 206c are respectively fitted around the eccentric members 203a, 203b, 203c via the rollers 205a, 205b, 205c.

In this embodiment, the arrangement is such that the rollers 205a, 205b, 205c are retained in the retainers 222a, 222b, 222c in such a manner as to be provided with a play in the radial direction. This arrangement makes it possible for the rollers 205a, 205b, 205c to move radially outwardly. Accordingly, as shown in FIG. 21, the rollers 205b retained by the retainers 222b can be made to pass over the eccentric member 203a disposed at one end and is then moved radially outwardly so as to be fitted over the central eccentric member 203b.

The fitting of the rollers 205b over the central eccentric member 203b is carried out with the following conditions of play and retainer.

Figure 22:
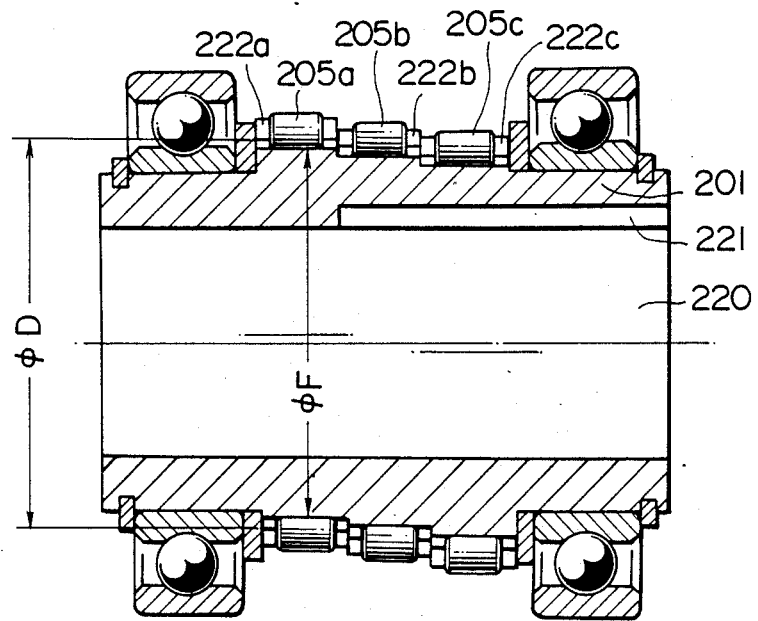
FIG. 22 is a cross-sectional view illustrating a state in which the bearings of FIG. 21 have been assembled onto the eccentric-member shaft.

As shown in FIGS. 21 and 22, it is assumed that the inside diameter of the retainer 222b is $\phi D$, and that the diameter of an inscribed circle in a case where the roller 205b has moved radially outwardly inside the retainer 222b to a maximum is $\phi D'$, and $\phi D$ and $\phi D'$ are set in such a manner as to be equivalent to or greater than $$\phi F + 2e \sin(\theta/2)$$

where $\phi F$ is the outside diameter of the eccentric member, e is an amount of eccentricity, and $\theta$ is a difference in the phase at which the eccentric member is disposed. If the clearance is formed in the retainer to assume the above-mentioned relationship, the rollers 205b can be made to pass over the eccentric member 203a or 203c at the outward end and fitted over the intermediate eccentric member 203b.

It should be noted that the value of $2e \sin(\theta/2)$ refers to a distance between centers Oa, Ob, Oc of the respective eccentric members 203a, 203b, 203c in cases where the three eccentric members 203a, 203b, 203c disposed with an amount of eccentricity e with respect to the center 0 of the eccentric-member shaft 201 are arranged with a phase difference of 120°.

FIG. 25 corresponds to the third embodiment of the present invention shown in FIG. 8, a central portion of an eccentric-member shaft 41 is made into a hollow portion 42 having a fixed inside diameter over the entire length thereof. Namely, the eccentric member $3_3$ is constituted by the small-diameter portion $3_{31}$ and the spacer ring $3_{32}$ so that the rollers $6_2$ and the inner peripheral ring $6A_2$ can be inserted and fitted over the central eccentric member $3_2$. In this embodiment, the load applied to the rollers $6_1$, $6_2$, $6_3$ and the inner peripheral rings $6A_1$, $6A_2$, $6A_3$ is alleviated, and the radial thickness of the inner peripheral rings $6A_1$, $6A_2$, $6A_3$ can be reduced, so that the inside diameter of the hollow portion 42 can be increased. For this reason, if the planetary gear system in accordance with the present invention is used as a joint of a robot, it becomes possible to allow a large shaft to be inserted through the hollow portion. Thus, since it is possible to transmit a large torque, a robot joint which is compact and is capable of transmitting a large torque can be obtained.

Figure 26:
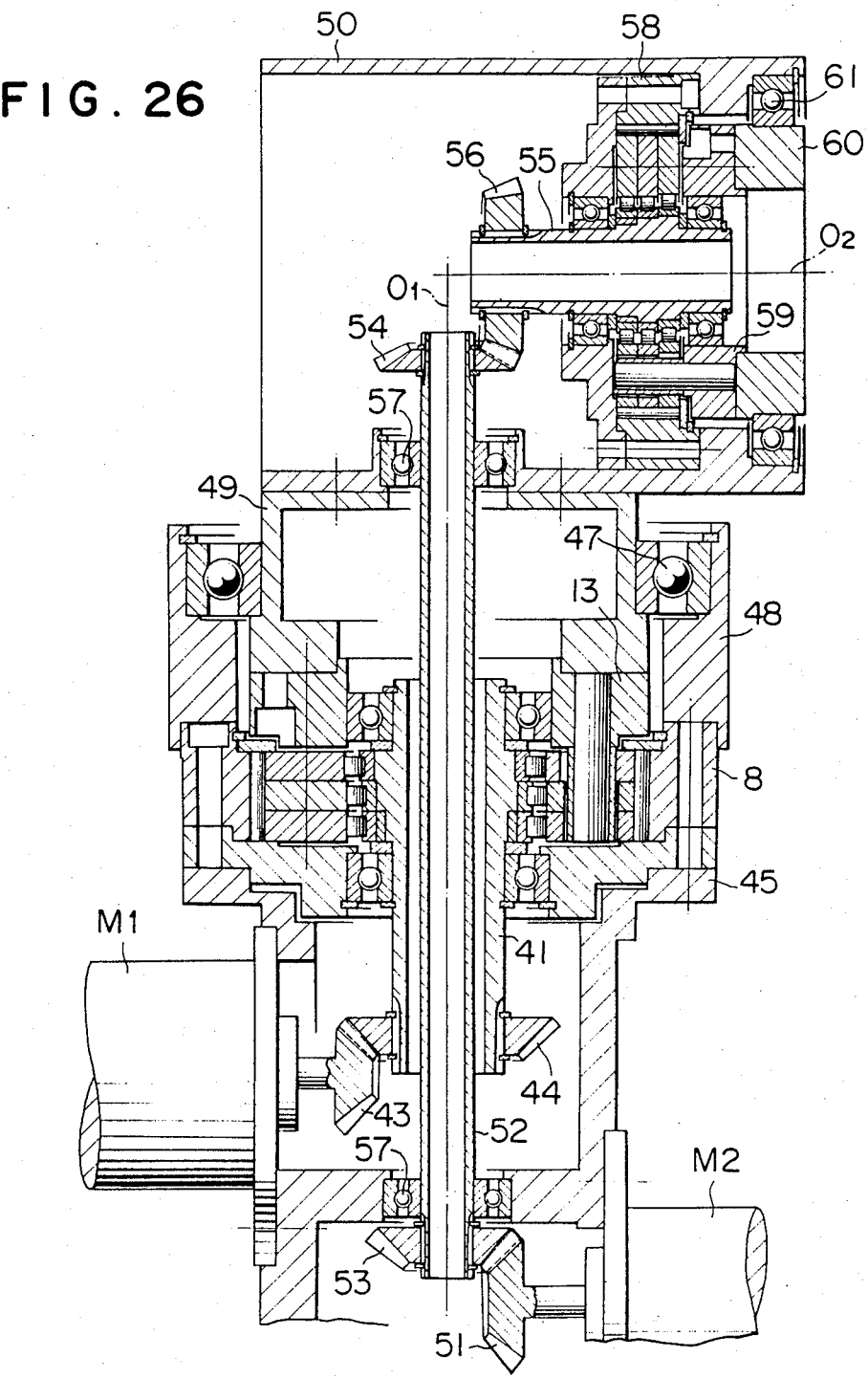
FIG. 26 is a cross-sectional view illustrating an example of a robot's joint using the planetary reduction gear shown in FIG. 25.

Referring to FIG. 26, the rotation of a motor M1 is transmitted to a first planetary reduction gear via a bevel gear 43 provided on an output shaft of the motor M1 and a bevel gear 44 provided on an eccentric-member shaft 41 of the first planetary reduction gear. The internal gear 8 is secured to a motor retaining frame 45 inside this first planetary reduction gear, so that the internal pin retaining flange 13 is the output side of the reduced rotation. The internal pin retaining flange 13 is rotatably supported by a bearing 47 between the same and an internal gear flame 48, and is connected to an arm 50 of the robot via a connecting frame 49. For this reason, the rotation of the internal pin retaining flange 13 is the rotation about an axis $O_1$ of the robot's arm 50. The axis $O_1$ is the rotational center of the first planetary reduction gear.

In addition, the rotation of a motor M2 is transmitted to a bevel gear 53 provided on a penetrating shaft 52 via a bevel gear 51 provided on an output shaft of the motor M2. Although the penetrating shaft 52 is a hollow shaft in the illustrated example, it may be formed as a solid shaft. A bevel gear 54 is provided at the other end of the penetrating shaft 52 and meshes with a bevel gear 56 provided at an eccentric-member shaft 55 of a second planetary reduction gear. The penetrating shaft 52 is provided such as to penetrate the hollow portion of the eccentric-member shaft 41 of the first planetary reduction gear, and is rotatably supported by a bearing 57 in the vicinity of the opposite ends thereof. Thus, the rotation of the motor M2 is transmitted to the eccentric-member shaft 55 of the second planetary reduction gear through the penetrating shaft 52. The second planetary reduction gear is disposed in the arm 50 of the robot, and an internal gear 58 is secured to the arm 50, so that the rotation of the eccentric-member shaft 55 is output as the reduced rotation of the internal pin retaining flange 59. An operating end 60 of the robot's arm 50 is secured to the internal pin retaining flange 59, the operating end 60 being rotatably supported by a bearing 61 between the same and the arm 50. The rotation of this operating end 60 becomes the rotation about an axis $O_2$, which is the rotational center of the second planetary reduction gear.

Thus, the operating end 60 of the robot is made to revolve round the axis $O_1$ by the motor M1, and is made to rotate round the axis $O_2$ by the motor M2, thereby performing a predetermined operation.

With such a robot's joint, it is desirable to allow as high a torque as possible to be transmitted, and, for that purpose, the greater the diameter of the penetrating shaft 52, the better. In other words, the greater the inside diameter of the hollow portion of the eccentric-member shaft 41, the better. Accordingly, it becomes possible to meet such a demand if the shaft is made into an eccentric-member shaft provided with the three eccentric members, as in the case of the present invention.

It should be noted that the present invention is not restricted to the foregoing embodiments.

For instance, although, in the arrangement shown in FIG. 25, the internal gear 8 is rotated together with the casing and the internal pin retaining flange 13 is fixed, it is apparent from the purport of the present invention that the present invention also includes an arrangement in which the internal pin retaining flange 13 is rotated, the internal gear 8 is fixed integrally to the casing, and an output is obtained from the internal pin retaining flange 13.

What is claimed is:

1. A planetary gear system comprising:

input or output means;

an eccentric-member shaft having integrally formed thereon at least three eccentric members juxtaposed axially on said shaft with phases of said eccentric members offset with respect to each other, said shaft being operably connected to said input or output means;

external gears respectively fitted around each of said eccentric members via rollers;

inner peripheral rings respectively rollably supporting each of said rollers fitted around an outer periphery of each of said eccentric members;

an internal gear internally meshing with said external gears;

at least one internal pin which is inserted with a play into at least one internal hole formed in each of said external gears; and a flange for retaining said internal pin, either one of said internal gears or said flange being held stationary, the other being coupled with said output or input means, an external configuration of an eccentric member of said eccentric members disposed at an end portion, amongst said eccentric members, has a diameter smaller than an external configuration of said remaining eccentric members adjacent thereto, an inner peripheral ring of said inner peripheral rings and fitted to said smaller diameter eccentric member having a thickness greater than those of said inner peripheral rings respectively fitted to other said eccentric members.

2. A planetary gear system comprising:

input or output means;

an eccentric-member shaft having integrally formed thereon at least three eccentric members juxtaposed axially on said shaft with phases of said eccentric members offset with respect to each other, said shaft being operably connected to said input or output means;

external gears respectively fitted around each of said eccentric members via rollers;

inner peripheral rings respectively rollably supporting each of said rollers fitted around an outer periphery of each of said eccentric members;

an internal gear internally meshing with said external gears;

at least one internal pin which is inserted with a play into at least one internal hole formed in each of said external gears; and a flange for retaining said internal pin, either one of said internal gears or said flange being held stationary, the other being coupled with said output or input means, an external configuration of an eccentric member of said eccentric members and located at an end portion amongst said eccentric members has a diameter which is smaller than the external configuration of said eccentric member adjacent thereto, and a spacer ring having an external diameter equivalent to those of other said eccentric members fitted around an outer periphery of said smaller diameter eccentric member.

3. A planetary gear system according to claim 1 or 2, wherein each of said inner peripheral rings has a pair of flanges respectively projecting from opposite sides thereof, and one of said pair of flanges, provided to said inner peripheral ring located at an end portion of said inner peripheral ring is constituted by an annular plate separable from said inner peripheral ring.

4. A planetary gear system according to claim 1 or 2, further comprising a retainer adapted to rotatably retain said rollers between each of said inner peripheral rings and each of said external gears at intervals between adjacent said rollers, said retainer having a configuration that allows each of said rollers to be disengageable therefrom radially outwardly.

5. A planetary gear system according to claim 1 or 2, further comprising a plurality of retainers, each adapted to retain said rollers at intervals between adjacent said rollers in such a manner as to allow a play to be produced in a radial direction, wherein, if it is assumed that an amount of eccentricity of said eccentric member is e, and that an angle of a phase difference of each of said eccentric members is $\theta$, an inscribed circle of each of said rollers with said roller being moved radially outwardly to a maximum limit thereof is equivalent to or greater than an outside diameter of eccentric member $+2e \sin(\theta/2)$.

6. A planetary gear system according to any of claims 1 or 2, wherein said all of said eccentric members are formed integrally with a hollow eccentric-member shaft.

* * * * *

UNITED STATES PATENT AND TRADEMARK OFFICE
CERTIFICATE OF CORRECTION

PATENT NO. : 4,909,102

DATED : March 20, 1990

INVENTOR(S) : HAGA et al

It is certified that error appears in the above-identified patent and that said Letters Patent is hereby corrected as shown below:

On the cover page, Item [75], after "Obu," the following should appear:  --Makoto Tamaki, Toyoake; Atsushi Ishikawa, Obu, all of--.

Signed and Sealed this

Twenty-fifth Day of June, 1991

Attest:

Attesting Officer

HARRY F. MANBECK, JR.

Commissioner of Patents and Trademarks